United States Patent [19]

Newland et al.

[11] Patent Number: 5,197,288
[45] Date of Patent: Mar. 30, 1993

[54] DETACHABLE FUEL MANIFOLD FOR GAS TURBINE ENGINES

[75] Inventors: Allan B. Newland, St. Lambert; Ronald Portanier, Longueuil; Jan H. Stastny, St. Bruno, all of Canada

[73] Assignee: United Technologies Corporation, Hartford, Conn.

[21] Appl. No.: 804,647

[22] Filed: Dec. 6, 1991

[51] Int. Cl.$^5$ ............................ F02C 1/00; F02G 3/00
[52] U.S. Cl. .................................... 60/734; 60/739
[58] Field of Search .................. 60/39.31, 39.32, 734, 60/739

[56] References Cited

U.S. PATENT DOCUMENTS

| | | | |
|---|---|---|---|
| 2,690,648 | 10/1954 | Pearce et al. | 60/739 |
| 3,516,252 | 6/1970 | Udell et al. | 60/739 |
| 4,028,888 | 6/1977 | Pilarczyk | 60/739 |
| 4,467,610 | 8/1984 | Pearson et al. | 60/739 |
| 5,031,407 | 7/1991 | Zaremba et al. | 60/739 |

Primary Examiner—Richard A. Bertsch
Assistant Examiner—Howard R. Richman
Attorney, Agent, or Firm—James M. Rashid

[57] ABSTRACT

A gas turbine engine (10) incorporates a fuel manifold (12) that distributes fuel to fuel injectors (14) that are mounted to a support casing (16). When a problem is encountered within the fuel injector (14), the problem injector (14) may be disconnected from the fuel manifold (12) and removed without disturbing the fuel manifold (12).

8 Claims, 6 Drawing Sheets

DETACHABLE FUEL MANIFOLD FOR GAS TURBINE ENGINES

DESCRIPTION

1. Technical Field

This invention relates to a gas turbine engine, and more particularly to a gas turbine engine having a fuel manifold that is coupled to fuel injectors.

2. Background Art

A fuel manifold of a gas turbine engine distributes fuel from a fuel control system to fuel injectors mounted on a support casing. Conventionally, the fuel manifold is disposed radially outward from the fuel injectors and is coupled to each fuel injector by a lock-wired threaded collar fastener, or as commonly known in the art, a lock-wired super-B nut. When a problem is encountered within a fuel injector, the lock-wire on at least the problem fuel injector is cut and removed, the fuel manifold is disconnected from at least the problem fuel injector and pulled to the side of the problem fuel injector, and the problem fuel injector may be removed from the support casing. The requirement of disconnecting and removing the fuel manifold in order to remove or replace a single injector increases the repair time and repair costs.

3. Disclosure of the Invention

An object of the present invention is to provide fuel injectors of a gas turbine engine that are freely detachable from a fuel manifold. It is a further object of the present invention to provide a fuel injector and fuel manifold arrangement wherein the fuel manifold need not to be moved when removing an individual fuel injector.

According to the present invention, a fuel manifold for a gas turbine engine is provided having couplings that are disposed adjacent to a nozzle portion of each fuel injector, the couplings allowing the fuel manifold to quickly connect in fluid communication with each fuel injector without moving the fuel manifold. Because individual fuel injectors can be removed without disturbing the fuel manifold, repair time and repair costs are significantly decreased.

Other objects, features, and advantages of the invention will become apparent in light of the following description thereof.

BEST MODE FOR CARRYING OUT THE INVENTION

Figure 1:
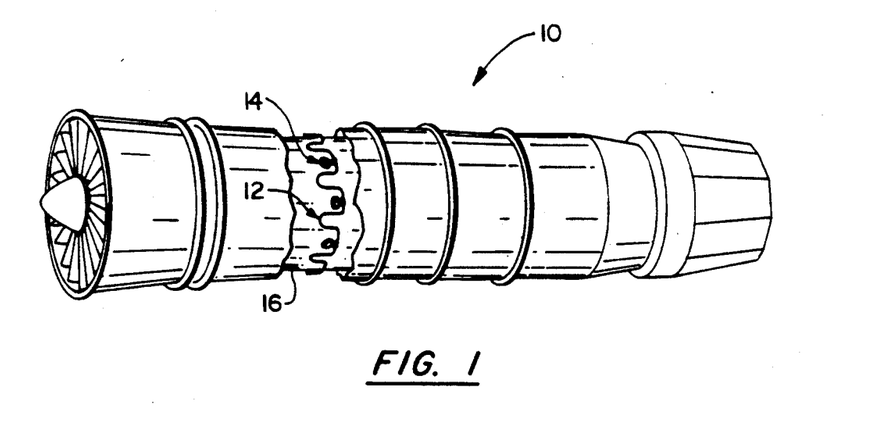
FIG. 1 is a view of the exterior of a gas turbine engine showing the external fuel manifold and the mounted fuel injectors.

Referring to FIG. 1, a gas turbine engine 10 incorporates a fuel manifold 12 that distributes fuel to fuel injectors 14 that are mounted to a support casing 16. The description of the present invention below characterizes a gas turbine engine as having a single combustion chamber, however the present invention is also suitable for use in gas turbine engines having multiple combustion chambers.

Figure 2:
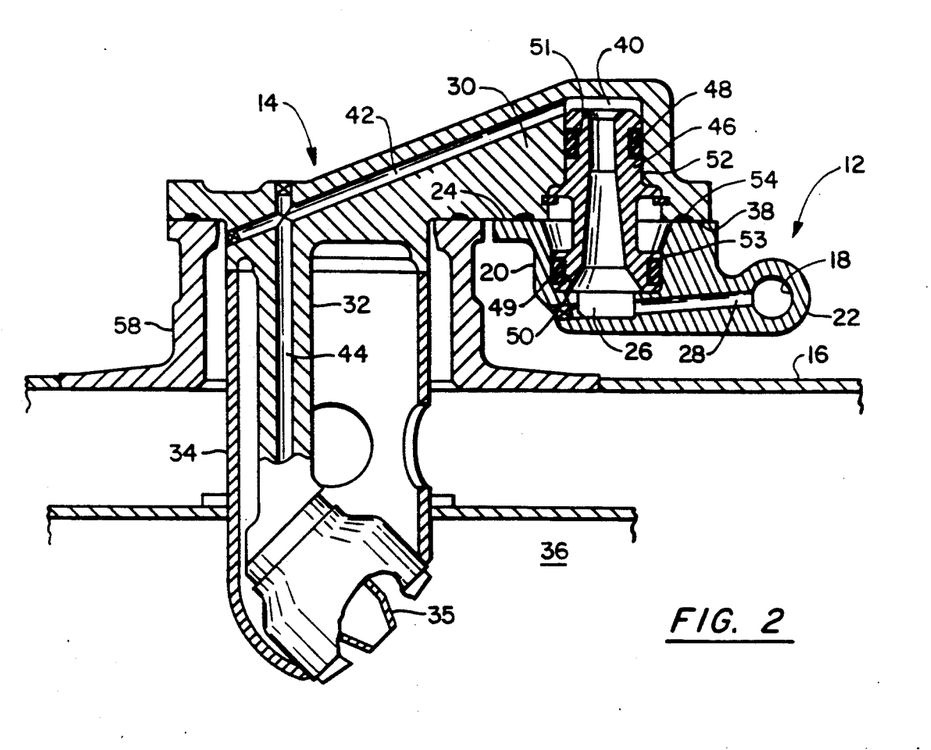
FIG. 2 is an enlarged sectional elevational view of a fuel injector coupled to a fuel manifold.

The fuel manifold 12 in FIG. 2 incorporates a plurality of conduits 18 extending between circumferentially adjacent injectors 14 in order to provide a means for carrying fuel around the support casing 16 of the gas turbine engine 10. A first means for connecting the conduit 18 in fluid communication with each fuel injector 14 is provided by a coupling 20 which is joined to the conduit 18 by a fitting 22. The fitting 22 may be welded or brazed to the conduit 18. A radially outward facing flanged surface 24 of the coupling 20 has a circular opening 26 in fluid communication with the conduit 18 via a bore 28. Fuel flows from a fuel control system (not shown) circumferentially to each fuel injector 14 by flowing through the conduit 18, diverging at the fitting 22 into the bore 28 in the coupling 20, and exiting through the opening 26.

Each fuel injector 14 includes an interfacing portion 30, a nozzle portion 32, and a protective shield 34. The nozzle portion 32 extends from the interfacing portion 30 down to a nozzle tip 35. The nozzle tip 35 provides a means for discharging the fuel into a combustion chamber 36. The interfacing portion 30 provides a second means for connecting the nozzle portion 32 to the coupling 20. The interfacing portion 30 has an radially inward facing surface 38 with a circular opening 40 in fluid communication with the nozzle portion 32 via bores 42,44. The surface 38 of the interfacing portion 30 abuts the surface 24 of the coupling 20 when the injector 14 is installed. Fuel flows through the fuel injector 14 into the combustion chamber 36 by flowing through the opening 40 of the interfacing portion 30 into the bore 42 of the interfacing portion 30, thence into the bore 44 in the nozzle portion 32, flowing through the nozzle portion 32, and then exiting into the combustion chamber 36 at the nozzle tip 35.

FIG. 2 also shows a means for sealably connecting the interfacing portion 30 and the coupling 20 in the form of a cylinder 46. The cylinder 46 is seated between the opening 26 of the coupling 20 and the opening 40 of the interfacing portion 30. First and second O-rings 48,49 disposed in grooves 50,51 in outer surfaces 52,53 of the cylinder 46 provide the primary seal between the interfacing portion/coupling connection. A metal gasket between the flanged surface 24 of the coupling 20 and the surface 38 of the interfacing portion 30 provides a heat resistant metal-to-metal secondary seal 54 at the interfacing portion/coupling connection.

Figure 3:
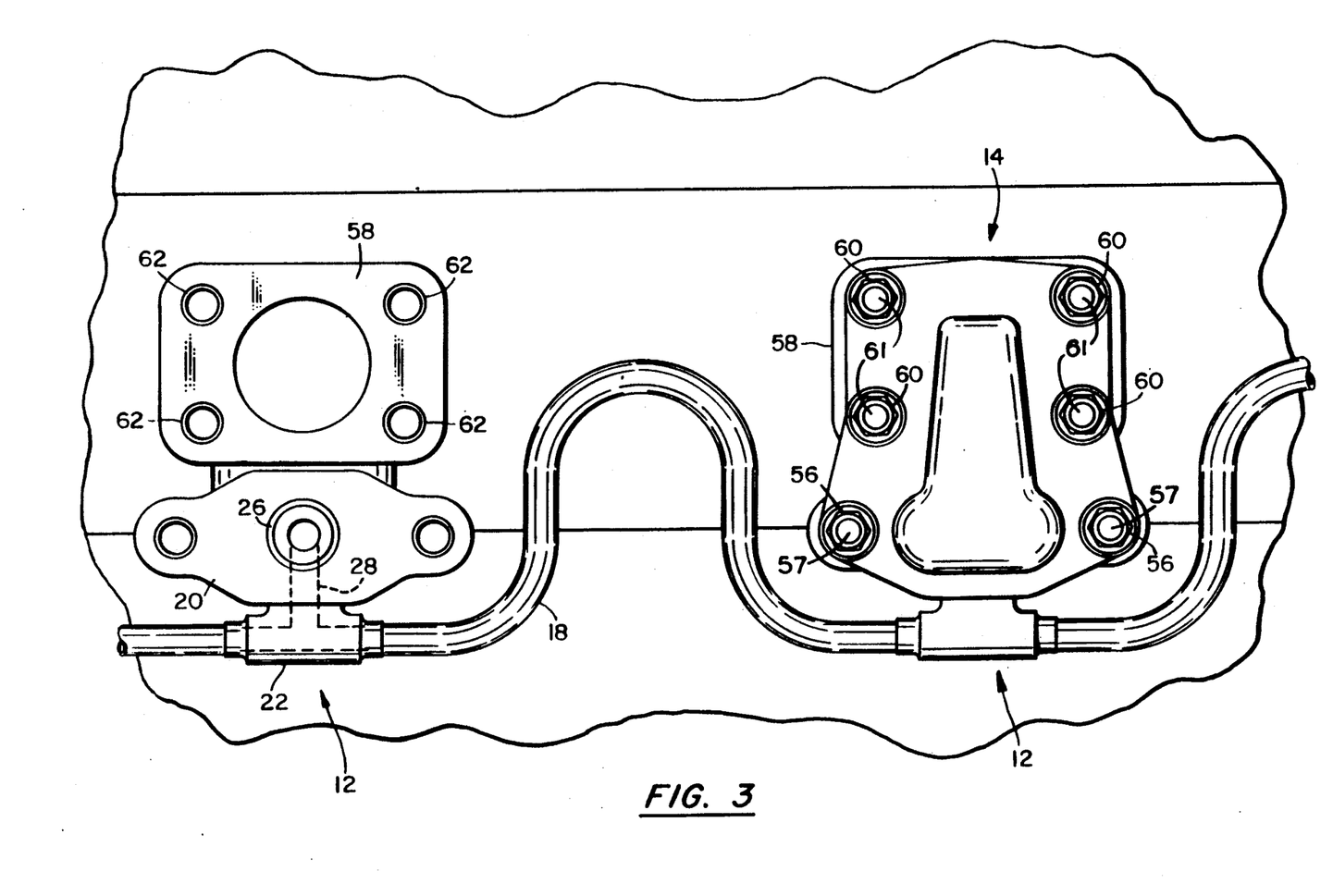
FIG. 3 is an enlarged exterior plan view of two fuel injector locations in a gas turbine engine.

Referring to FIG. 3, the coupling 20 is fastened to the interfacing portion 30 with lock nuts 56 and stud 57 as shown. The interfacing portion 30 of the fuel injector 14 is fastened to a boss 58, also with lock nuts 60 that screw into studs 61 inserted into tapped holes 62 in the boss 58 as shown. Referring to FIG. 2, the boss 58 is affixed to the casing 16 by welding, brazing, or other suitable methods.

When a problem is encountered within the fuel injector 14, the fuel injector 14 is disconnected from the fuel manifold 12 by unscrewing the lock nuts 56, the fuel injector 1 is disconnected from the boss 58 by unscrewing the lock nuts 60, and the problem fuel injector 14 is removed without disturbing the fuel manifold 12. The quick connect/disconnect sealing provided by the cylinder 46 and O-rings 48,49 as well as the metallic secondary seal provides a simple and effective means for breaking and restoring the fluid seal between the interfacing portion 30 and the coupling 20. Because the fuel manifold 12 can remain in place and connected to the problem free fuel injectors while the problem fuel injector 14 is repaired, repair time and costs are significantly decreased. The lock nuts 56,60 and studs are preferred to a fastening method requiring lock wire because the lock wire is time consuming to install and remove.

Figure 4:
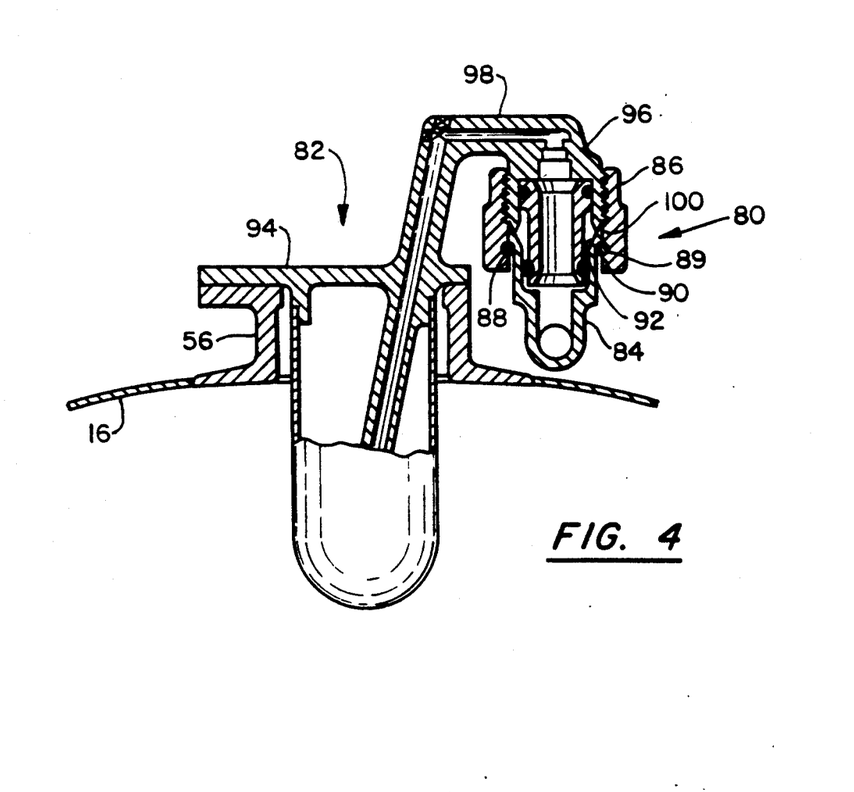
FIG. 4 is an enlarged sectional elevational view of a fuel injector coupled to a fuel manifold.
Figure 5:
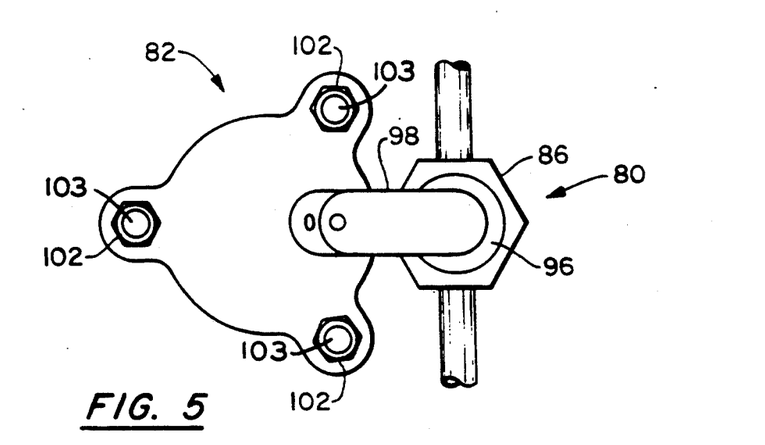
FIG. 5 is an enlarged exterior plan view of a fuel injector location in a gas turbine engine.

FIGS. 4 and 5 illustrate an alternative embodiment of the present invention that implements a super-B nut instead of lock nuts to mate the fuel manifold to the individual fuel injectors. Referring to FIG. 4, a fuel manifold 80 includes for each fuel injector 82 a flanged coupling 84, a threaded collar 86 that is disposed over the flanged coupling 84, and a wire 88 that is seated in a recess 89 of a shoulder 90 of the threaded collar 86. The flanged coupling 84 includes a radially outward facing beveled surface 92. The threaded collar/flanged coupling arrangement is commonly referred to in the art as a super-B nut and provides a first means for connecting each fuel injector 82 to each flanged coupling 84.

Each fuel injector 82 includes a base 94 that is joined in fluid communication to a threaded circular portion 96 by a neck 98. The threaded circular portion 96 with a radially inward facing beveled surface 100 provides a second means of connecting each fuel injector 82 in fluid communication to each flanged coupling 84.

The fuel manifold 80 is connected in fluid communication with the fuel injector 82 by screwing the threaded collar 86 of the fuel manifold 80 onto the threaded circular portion 96 of the fuel injector 82, thereby causing the radially outward facing beveled surface 92 of the flanged coupling 84 to mate with the radially inward facing beveled surface 100 of the threaded circular portion 96 forming a metal-to-metal secondary seal, 92, 100. The quick connect/disconnect sealing provided by a cylinder and O-rings as well as a metallic heat resistant secondary seal provided by the mating of the radially outward facing beveled surface 92 with the radially inward facing beveled surface 100 provides a simple and effective means for breaking and restoring the fluid seal between the threaded circular portion 96 and the flanged coupling 84. The wire 88 provides a thrust shoulder to torque down the threaded collar 86 onto the threaded circular portion 96. The base 94 of the fuel injector 82 is fastened to the boss 56 with lock nuts 102 threaded onto studs 103. The boss 56 is affixed to the casing 16 by welding or other suitable means.

The threaded collar/super-B nut of FIG. 4 requires lock wire to ensure that vibration does not disconnect the fuel injectors from the fuel manifold. Because the super-B nut requires lock-wire which is time consuming and costly to install and remove, the super-B nut is not the preferred means for fastening the fuel manifold to the fuel injector as compared, for example, to lock nuts and studs.

Figure 6:
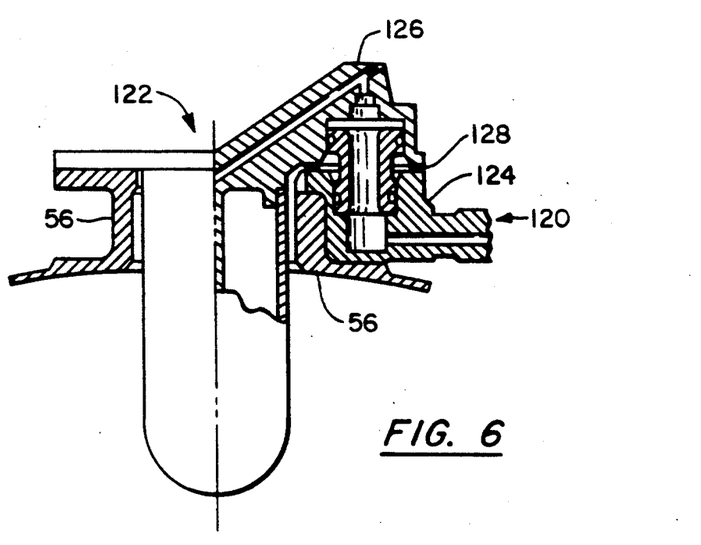
FIG. 6 is an enlarged sectional elevational view of a fuel injector coupled to a fuel manifold.
Figure 7:
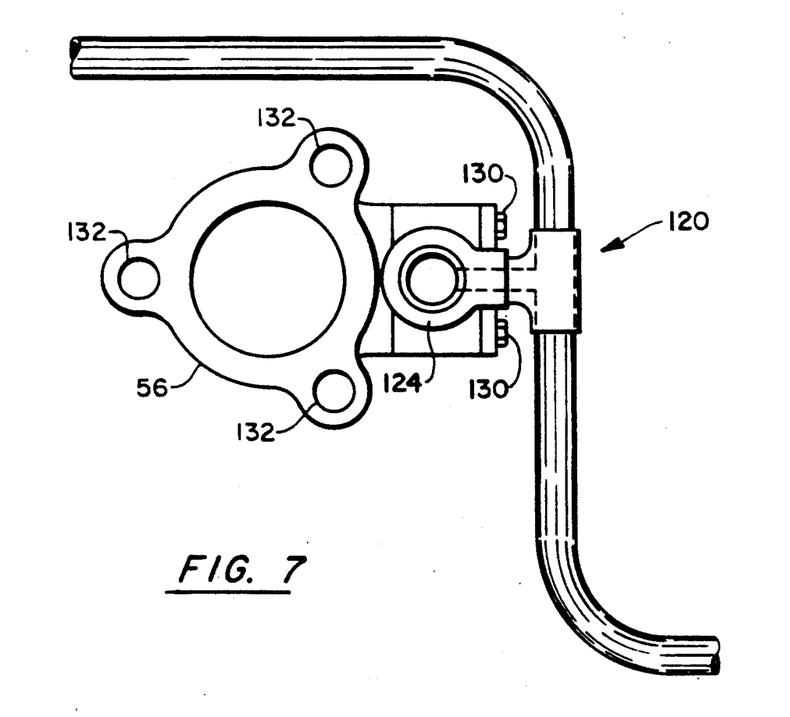
FIG. 7 is an enlarged exterior plan view of a fuel injector location in a gas turbine engine.

FIGS. 6 and 7 illustrate an alternative embodiment of the present invention that attaches the fuel manifold 120 to the boss 56 using lock nuts 130, instead of directly securing the fuel manifold to the fuel injector using lock nuts. Referring to FIG. 6, the fuel manifold 120 includes, for each fuel injector 122, a coupling 124 that provides a first means for connecting the fuel injector 122 in fluid communication to the fuel manifold 120. Each fuel injector 122 includes an interfacing portion 126 which provides a second means for connecting the fuel injector 122 in fluid communication to the coupling 124. A metal washer is disposed between the interfacing portion 126 and the coupling 124 to provide a heat resistant metal-to-metal secondary seal 128 at the interfacing portion/coupling connection.

Referring to FIG. 7, each coupling 124 of the fuel manifold 120 is attached to the boss 56 by lock nuts 130. Each fuel injector (not shown) is attached to the boss 56 by lock nuts (not shown) screwing onto studs (not shown) inserted into tapped holes 132 in the boss 56. The cantilever forces of the fuel injector/boss connection mate the fuel manifold to the fuel injector. The quick connect/disconnect sealing provided by a cylinder and O-rings as well as the metallic secondary seal 128 provides a simple and effective means for breaking and restoring the fluid seal between the interfacing portion 126 and the coupling 124.

Figure 8:
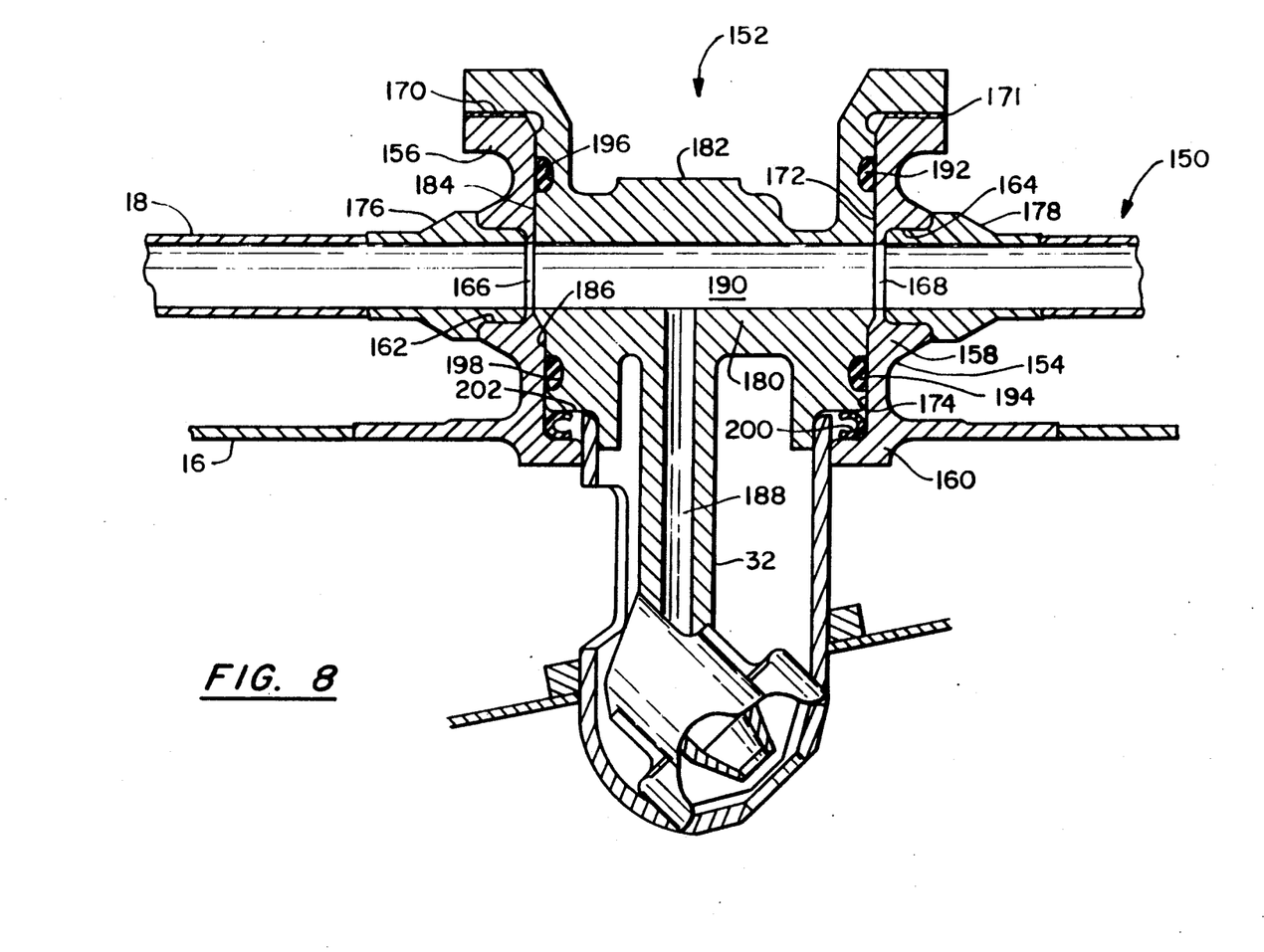
FIG. 8 is an enlarged sectional elevational view of a fuel injector location in a gas turbine engine.

FIG. 8 illustrates an embodiment of the present invention that integrates a means for connecting the fuel manifold in fluid communication to each fuel injector into a boss on the support casing. A fuel manifold 150 includes, for each fuel injector 152, a boss 154 projecting radially outward from the support casing 16. The boss 154 provides a first means for connecting the conduit 18 to each fuel injector 152. The boss 154 may be affixed onto the support casing 16 by welding, brazing, or other suitable means. The boss 154 has a first flanged portion 156, a lateral portion 158, and a shoulder portion 160. The lateral portion 158 has first and second circular cutouts 162,164 and first and second passageways 166,168. The first flanged portion 156 has a radially outward facing surface 170. First and second lateral surfaces 172,174 abut the fuel injector 152 when the fuel injector 152 is installed.

A first and second fitting 176,178 join the conduit 18 in fluid communication to the boss 154 at the circular cutouts 162,164. The fittings 176,178 are affixed to the conduit 18 and the boss 154 by welding, brazing or other suitable methods. The first and second passageways 166,168 connect the boss 154 in fluid communication to each fuel injector 152.

Each fuel injector 152 includes a nozzle portion 32, an interfacing portion 180, and a second flanged portion 182. The interfacing portion 180 and second flanged portion 182 share a third lateral surface 184 that abuts the boss 154 when the fuel injector 152 is installed. The interfacing portion 180 also has a fourth lateral surface 186 that abuts the boss 154 when the fuel injector 152 is installed. The nozzle portion 32 is joined in fluid communication to the interfacing portion 180 via a bore 188. The interfacing portion 180 has a third passageway 190 that connects the interfacing portion 180 in fluid communication with the boss 154 when the fuel injector is installed. The bore 188 and the third passageway 190 provide a second means for connecting the nozzle portion 32 in fluid communication to the boss 154 when the fuel injector 152 is installed.

The second flanged portion 182 protrudes radially outward from the interfacing portion 180. Each fuel injector 152 is fastened to the boss 154 by lock nuts (not shown) that go through the second flanged portion 182 and screw into holes tapped into the radially outward facing surface 170 of the first flanged portion 156. The lock nuts (not shown) provide a simple and effective means for quickly connecting the interfacing portion 180 to the boss 154 without removing the conduit 18.

FIG. 8 also shows a means for sealably connecting the boss 154 to the interfacing portion 180 in the form of first and second O-rings 192,194. The first O-ring 192 is seated in a groove 196 on the third lateral surface 184. The second O-ring 194 is seated in a groove 198 on the fourth lateral surface 186. A heat resistant metal spring washer 200 is seated between a step 202 of the interfacing portion 180 and the shoulder portion 160 of the boss 154. A heat resistant metal-to-metal seal 171 is also provided at the interface of the second flanged portion 182 of the fuel injector 152 and the first flanged portion 156 of the boss 154. The quick connect/disconnect sealing provided by the O-rings as well as the metallic secondary seals provides a simple and effective means for breaking and restoring the fluid seal between the fuel injector 152 and the boss 154.

Figure 9:
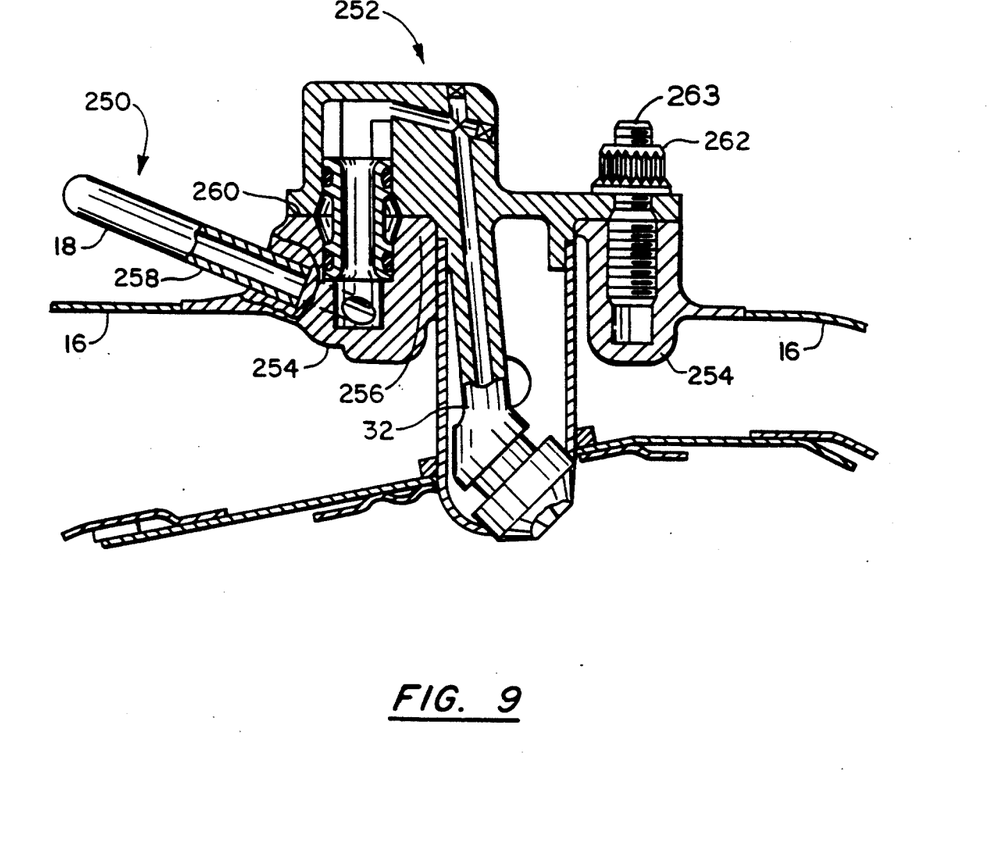
FIG. 9 is an enlarged sectional elevational view of a fuel injector location in a gas turbine engine.

FIG. 9 illustrates an alternative embodiment for integrating a first means for connecting the fuel manifold in fluid communication to each fuel injector into a boss on the support casing. A fuel manifold 250 includes, for each fuel injector 252, a boss 254 projecting radially outward from the support casing 16 that provides a first means for connecting the conduit 18 to each fuel injector 252. The boss 254 may be affixed onto the support casing 16 by welding, brazing, or other suitable means. The boss 254 has an interfacing portion 256. A first and second fitting 258 (second fitting not shown) join the conduit 18 in fluid communication with the interfacing portion 256. The fittings 258 may be affixed onto the conduit 18 and interfacing portion 256 by welding, brazing, or other suitable methods. The interfacing portion 256 is disposed adjacent to the nozzle portion 32 of each of said fuel injectors 252 and includes a radially outward facing surface 260 that abuts the second means for connecting the fuel injectors 252 to the fuel manifold 250. The second connecting means is identical to that illustrated in FIG. 2 above. The interfacing portion 256 is fastened to the fuel injector 152 by lock nuts 262 (only one shown) that and screw onto studs 263 inserted into holes tapped into the surface 260. The lock nuts 262 and studs 263 provide a simple and effective means for quickly connecting the interfacing portion 180 to the fuel injector 152 without removing the conduit 18.

In certain applications, two fuel lines, a primary fuel line and a secondary fuel line, bring fuel to the combustion chamber. The primary line is used for starting the gas turbine engine. Both the primary line and secondary line are used for normal running conditions. If two or more fuel lines are needed to bring fuel to the combustion chamber, the present invention adds a secondary conduit to the fluid manifold and a separate fuel path through the couplings of the fuel manifold to each starting fuel injector and into the combustion chamber.

Although the invention has been shown and described with respect to a particular embodiment thereof, it should be understood by those skilled in the art that the foregoing and various other changes, omissions, and additions in the form and detail thereof may be made therein without departing from the spirit and scope of the invention.

We claim:

1. An apparatus for distributing fuel from a fuel control system into a gas turbine engine comprising:

a fuel manifold having a means for carrying fuel around a support casing of the gas turbine engine; and a plurality of fuel injectors each having a nozzle portion joined in fluid communication with a means for discharging the fuel into a combustion chamber of the gas turbine engine;

characterized in that said fuel manifold further includes a first means for connecting said carrying means in fluid communication with each of said fuel injectors, said first connecting means being disposed adjacent to said nozzle portion;

each of said fuel injectors further includes a second means for connecting said nozzle portion in fluid communication with said first connecting means, said first and second connecting means being releasably connected and said fuel injector being removable without moving said carrying means and said first connecting means; and further comprising a means for sealably connecting said first connecting means in fluid communication with said second connecting means;

wherein said second connecting means is disposed adjacent to said nozzle portion and includes a radially inward facing surface interfacing with said first connecting means;

wherein said second connecting means is further characterized by:

an interfacing portion joining said nozzle portion in fluid communication with said first connecting means;

said interfacing portion being disposed adjacent to said nozzle portion;

said interfacing portion including said radially inward facing surface abutting said first connecting means;

lock nuts and studs fastening said first connecting means to said interfacing portion; and lock nuts and studs fastening said interfacing portion to a boss disposed on the casing.

2. An apparatus for distributing fuel from a fuel control system into a gas turbine engine comprising:

a fuel manifold having a means for carrying fuel around a support casing of the gas turbine engine; and a plurality of fuel injectors each having a nozzle portion joined in fluid communication with a means for discharging the fuel into a combustion chamber of the gas turbine engine;

characterized in that said fuel manifold further includes a first means for connecting said carrying means in fluid communication with each of said fuel injectors, said first connecting means being disposed adjacent to said nozzle portion;

each of said fuel injectors further includes a second means for connecting said nozzle portion in fluid communication with said first connecting means, said first and second connecting means being releasably connected and said fuel injector being removable without moving said carrying means and said first connecting means; and further comprising a means for sealably connecting said first connecting means in fluid communication with said second connecting means;

wherein said first connecting means further includes a radially outward facing surface interfacing with said second connecting means; and wherein said first connecting means is further characterized by:
a fitting joining said carrying means in fluid communication with a flanged coupling, said fitting being welded or brazed to said carrying means;
said flanged coupling being disposed adjacent to said nozzle portion of each of said fuel injectors;
said flanged coupling having a radially outward facing beveled surface abutting said second connecting means; and
a threaded collar disposed over said flanged coupling, said collar fastening said radially outward facing beveled surface of said flanged coupling in fluid communication with said second connecting means.

3. An apparatus for distributing fuel from a fuel control system into a gas turbine engine comprising:
a fuel manifold having a means for carrying fuel around a support casing of the gas turbine engine; and
a plurality of fuel injectors each having a nozzle portion joined in fluid communication with a means for discharging the fuel into a combustion chamber of the gas turbine engine;
characterized in that
said fuel manifold further includes a first means for connecting said carrying means in fluid communication with each of said fuel injectors, said first connecting means being disposed adjacent to said nozzle portion;
each of said fuel injectors further includes a second means for connecting said nozzle portion in fluid communication with said first connecting means, said first and second connecting means being releasably connected and said fuel injector being removable without moving said carrying means and said first connecting means; and
further comprising a means for sealably connecting said first connecting means in fluid communication with said second connecting means; and
wherein said second connecting means is disposed adjacent to said nozzle portion and includes a radially inward facing surface interfacing with said first connecting means;
said nozzle portion being joined to a base, said base in fluid communication with said nozzle portion;
said base joined to a neck protruding radially outward from the base, said neck in fluid communication with said base;
said neck joined to a threaded circular portion, said threaded circular portion in fluid communication with said neck;
said threaded circular portion being disposed adjacent to said nozzle portion;
said threaded circular portion having a radially inward facing beveled surface abutting said first connecting means; and
said threaded circular portion engaged with said first connecting means.

4. An apparatus for distributing fuel from a fuel control system into a gas turbine engine comprising:
a fuel manifold having a means for carrying fuel around a support casing of the gas turbine engine; and
a plurality of fuel injectors each having a nozzle portion joined in fluid communication with a means for discharging the fuel into a combustion chamber of the gas turbine engine;
characterized in that
said fuel manifold further includes a first means for connecting said carrying means in fluid communication with each of said fuel injectors, said first connecting means being disposed adjacent to said nozzle portion;
each of said fuel injectors further includes a second means for connecting said nozzle portion in fluid communication with said first connecting means, said first and second connecting means being releasably connected and said fuel injector being removable without moving said carrying means and said first connecting means; and
further comprising a means for sealably connecting said first connecting means in fluid communication with said second connecting means; and
wherein said second connecting means is disposed adjacent to said nozzle portion and includes a radially inward facing surface interfacing with said first connecting means;
wherein said second connecting means is further characterized by:
an interfacing portion joining said nozzle portion in fluid communication with said first connecting means;
said interfacing portion being disposed adjacent to said nozzle portion;
said interfacing portion including said radially inward facing surface abutting said first connecting means; and
lock nuts and studs fastening said interfacing portion to said boss disposed on the casing.

5. An apparatus for distributing fuel from a fuel control system into a gas turbine engine comprising:
a fuel manifold having a means for carrying fuel around a support casing of the gas turbine engine; and
a plurality of fuel injectors each having a nozzle portion joined in fluid communication with a means for discharging the fuel into a combustion chamber of the gas turbine engine;
characterized in that
said fuel manifold further includes a first means for connecting said carrying means in fluid communication with each of said fuel injectors, said first connecting means being disposed adjacent to said nozzle portion;
each of said fuel injectors further includes a second means for connecting said nozzle portion in fluid communication with said first connecting means, said first and second connecting means being releasably connected and said fuel injector being removable without moving said carrying means and said first connecting means; and
further comprising a means for sealably connecting said first connecting means in fluid communication with said second connecting means; and
wherein said sealably connecting means is further characterized by:
a cylinder seated between circular opening of said first connecting means and said second connecting means;
first and second O-rings disposed in grooves in outer surfaces of said cylinder; and
a heat resistant metal-to-metal seal between said first connecting means and said second connecting means.

6. An apparatus for distributing fuel from a fuel control system into a gas turbine engine comprising:
- a fuel manifold having a means for carrying fuel around a support casing of the gas turbine engine; and
- a plurality of fuel injectors each having a nozzle portion joined in fluid communication with a means for discharging the fuel into a combustion chamber of the gas turbine engine;

characterized in that said fuel manifold further includes a first means for connecting said carrying means in fluid communication with each of said fuel injectors, said first connecting means being disposed adjacent to said nozzle portion;

each of said fuel injectors further includes a second means for connecting said nozzle portion in fluid communication with said first connecting means, said first and second connecting means being releasably connected and said fuel injector being removable without moving said carrying means and said first connecting means; and further comprising a means for sealably connecting said first connecting means in fluid communication with said second connecting means; and wherein said first connecting means is further characterized by:
- a boss projecting radially outward from said support casing, said boss being welded or brazed onto said support casing;
- said boss having a first flanged portion, a lateral portion, and a shoulder portion;
- said first flanged portion having a radially outward facing surface;
- said first flanged portion and said lateral portion sharing a first lateral surface;
- said shoulder portion having a second lateral surface;
- said first and second lateral surfaces abutting said second connecting means when said fuel injector is installed;
- said lateral portion having first and second circular cutouts and first and second passageways;
- a first and second fitting joining said carrying means in fluid communication with said lateral portion at said first and second circular cutouts, said fittings being welded or brazed to said carrying means, said fittings being welded or brazed to said lateral portion;
- said first and second passageways connecting said lateral portion in fluid communication to said second connecting means when said fuel injector is installed;
- said second connecting means fastened to said first flanged portion of said boss by lock nuts that screw onto studs inserted into holes tapped into said radially outward facing surface of said first flanged portion.

7. An apparatus for distributing fuel from a fuel control system into a gas turbine engine comprising:
- a fuel manifold having a means for carrying fuel around a support casing of the gas turbine engine; and
- a plurality of fuel injectors each having a nozzle portion joined in fluid communication with a means for discharging the fuel into a combustion chamber of the gas turbine engine;

characterized in that said fuel manifold further includes a first means for connecting said carrying means in fluid communication with each of said fuel injectors, said first connecting means being disposed adjacent to said nozzle portion;

each of said fuel injectors further includes a second means for connecting said nozzle portion in fluid communication with said first connecting means, said first and second connecting means being releasably connected and said fuel injector being removable without moving said carrying means and said first connecting means; and further comprising a means for sealably connecting said first connecting means in fluid communication with said second connecting means; and wherein said second connecting means is further characterized by:
- said nozzle portion being joined in fluid communication to an interfacing portion;
- said interfacing portion being joined to a second flanged portion protruding radially outward from said interfacing portion;
- said interfacing portion and said second flanged portion sharing a third lateral surface;
- said interfacing portion having a fourth lateral surface;
- said third and fourth lateral surfaces abutting said first connecting means when said fuel injector is installed;
- said interfacing portion having a third passageway connecting said interfacing portion in fluid communication with said first connecting means when said fuel injector is installed;
- said second flanged portion fastened to said first connecting means by lock nuts that screw onto studs inserted into holes tapped into said first connecting means;

and wherein said sealably connecting means is further characterized by:
- a first O-ring being seated in a groove on said third lateral surface of said second flanged portion;
- a second O-ring being seated in a groove on said fourth lateral surface of said interfacing portion;
- a heat resistant metal spring washer seated between a step of said interfacing portion and said first connecting means; and
- a heat resistant metal-to-metal seal at the interface of said second flanged portion and said first connecting means.

8. An apparatus for distributing fuel from a fuel control system into a gas turbine engine comprising:
- a fuel manifold having a means for carrying fuel around a support casing of the gas turbine engine; and
- a plurality of fuel injectors each having a nozzle portion joined in fluid communication with a means for discharging the fuel into a combustion chamber of the gas turbine engine;

characterized in that said fuel manifold further includes a first means for connecting said carrying means in fluid communication with each of said fuel injectors, said first connecting means being disposed adjacent to said nozzle portion;

each of said fuel injectors further includes a second means for connecting said nozzle portion in fluid communication with said first connecting means, said first and second connecting means being releasably connected and said fuel injector being removable without moving said carrying means and said first connecting means; and further comprising a means for sealably connecting said first connecting means in fluid communication with said second connecting means; and wherein said first connecting means is further characterized by:

a boss projecting radially outward from said support casing, said boss being welded or brazed onto said support casing;

said boss having an interfacing portion;

said interfacing portion being disposed adjacent to said nozzle portion of each of said fuel injectors;

said interfacing portion including a radially outward facing surface abutting said second connecting means;

fittings joining said carrying means in fluid communication with said interfacing portion, said fitting being welded or brazed to said carrying means;

said interfacing portion connecting said fittings in fluid communication with said second connecting means; and said interfacing portion fastened to said second connecting means by lock nuts that screw onto studs inserted into holes tapped into said radially outward facing surface of said first connecting means.

* * * * *

UNITED STATES PATENT AND TRADEMARK OFFICE
CERTIFICATE OF CORRECTION

PATENT NO. : 5,197,288
DATED : March 30, 1993
INVENTOR(S) : Allan B. Newland, et. al.

It is certified that error appears in the above-indentified patent and that said Letters Patent is hereby corrected as shown below:

Title page, item [73], Assignee:  should read-- Pratt & Whitney Canada Inc. Longueuil, Quebec, Canada--

Signed and Sealed this

Seventh Day of May, 1996

*Attest:*

BRUCE LEHMAN

*Attesting Officer*     *Commissioner of Patents and Trademarks*